US010620785B2

(12) United States Patent
Kidron et al.

(10) Patent No.: US 10,620,785 B2
(45) Date of Patent: Apr. 14, 2020

(54) DEVICE FOR DISPLAYING ELECTRONIC COMMUNICATIONS RECEIVED FROM COMMUNICATIONS SERVICES

(71) Applicant: HEWLETT-PACKARD DEVELOPMENT COMPANY, L.P., Houston, TX (US)

(72) Inventors: Adi Kidron, Yehud (IL); Adam Lahav, Nes Ziona (IL)

(73) Assignee: MICRO FOCUS LLC, Santa Clara, CA (US)

( * ) Notice: Subject to any disclaimer, the term of this patent is extended or adjusted under 35 U.S.C. 154(b) by 335 days.

(21) Appl. No.: 14/898,660

(22) PCT Filed: Jun. 27, 2013

(86) PCT No.: PCT/US2013/048321
§ 371 (c)(1),
(2) Date: Dec. 15, 2015

(87) PCT Pub. No.: WO2014/209329
PCT Pub. Date: Dec. 31, 2014

(65) Prior Publication Data
US 2016/0124592 A1    May 5, 2016

(51) Int. Cl.
*G06F 3/048* (2013.01)
*G06F 3/0482* (2013.01)
*G06Q 10/10* (2012.01)
*G06F 3/0484* (2013.01)
*H04L 12/58* (2006.01)

(52) U.S. Cl.
CPC ........ *G06F 3/0482* (2013.01); *G06F 3/04842* (2013.01); *G06Q 10/107* (2013.01); *H04L 51/24* (2013.01)

(58) Field of Classification Search
None
See application file for complete search history.

(56) References Cited

U.S. PATENT DOCUMENTS

| 7,680,513 | B2 | 3/2010 | Haitani et al. |
| 8,065,369 | B2 | 11/2011 | Turski et al. |
| 8,140,621 | B2 | 3/2012 | Vance et al. |

(Continued)

FOREIGN PATENT DOCUMENTS

WO    WO-2013010039    1/2013

OTHER PUBLICATIONS

International Search Report & Written Opinion, dated Mar. 27, 2014, PCT Patent Application No. PCT/US2013/048321, 10 pages.

(Continued)

*Primary Examiner* — William C Trapanese

(57) ABSTRACT

Examples disclosed herein provide notifications to a user of a communications device. The communications device groups electronic communications received from different communications services according to senders of the electronic communications. The communications device sorts a list of one or more of the senders according to the electronic communications received. The communications device displays the sorted list via a graphical user interface of the communications device. For each sender on the list, the communications device displays an indication of a number of electronic communications received from the sender.

18 Claims, 9 Drawing Sheets

(56) References Cited

U.S. PATENT DOCUMENTS

| | | |
|---|---|---|
| 2005/0108346 A1 | 5/2005 | Malik |
| 2007/0035513 A1 | 2/2007 | Sherrard et al. |
| 2007/0129112 A1* | 6/2007 | Tarn ................. H04M 1/72552 |
| | | 455/566 |
| 2007/0282960 A1 | 12/2007 | Goldman |
| 2008/0155471 A1* | 6/2008 | Lynn ............... H04M 1/274583 |
| | | 715/811 |
| 2011/0111777 A1* | 5/2011 | Wakasa ............ H04M 1/7253 |
| | | 455/466 |
| 2011/0202853 A1 | 8/2011 | Mujkic |
| 2011/0294551 A1 | 12/2011 | Forstall et al. |
| 2013/0055110 A1 | 2/2013 | Kiedinger |
| 2013/0080954 A1* | 3/2013 | Carlhian ......... H04M 1/274583 |
| | | 715/769 |
| 2013/0111366 A1* | 5/2013 | Silbey .................... A63F 13/12 |
| | | 715/757 |
| 2013/0218792 A1* | 8/2013 | Gorti ...................... G06Q 30/02 |
| | | 705/319 |
| 2013/0267208 A1* | 10/2013 | Rhim ..................... H04W 4/16 |
| | | 455/414.1 |
| 2014/0295808 A1* | 10/2014 | Ely ................ H04M 1/274583 |
| | | 455/414.1 |

OTHER PUBLICATIONS

TACKK, Buy Blackberry Z10—a Smart Phone for Smart People, 2013, <http://tackk.com/buy-blackberry-z10-smart-phone>, 3 pages.

* cited by examiner

DEVICE FOR DISPLAYING ELECTRONIC COMMUNICATIONS RECEIVED FROM COMMUNICATIONS SERVICES

CROSS-REFERENCE TO RELATED APPLICATION

This application is a U.S. National Stage Application of and claims priority to International Patent Application No. PCT/US2013/048321, filed on Jun. 27, 2013, and entitled "DEVICE FOR DISPLAYING ELECTRONIC COMMUNICATIONS RECEIVED FROM COMMUNICATIONS SERVICES".

BACKGROUND

With the introduction of mobile computing devices, such as smartphones and tablets, individuals are now more readily accessible than ever before. By utilizing such communications devices, individuals are able to exchange electronic communications with each other in various forms, such as by a phone call, a text message, an email, a videoconference, or via a social networking service. Each form of communication, or communications service, may be available on a device via an application.

With various communications services available for an individual to be reached, it may be difficult for the individual to promptly respond to every electronic communication received. In addition, an individual may not be available at a particular time to respond to communications received. Therefore, the device may provide an indication of the missed communications from the various communications services.

DRAWINGS

FIG. 1 illustrates a graphical user interlace (GUI) of a mobile communications device with various communications services applications available to be run on the mobile device, according to one example;

FIGS. 2A-B illustrate example screenshots of a GUI of a mobile communications device utilizing the people-centric approach;

DETAILED DESCRIPTION

Figure 1:
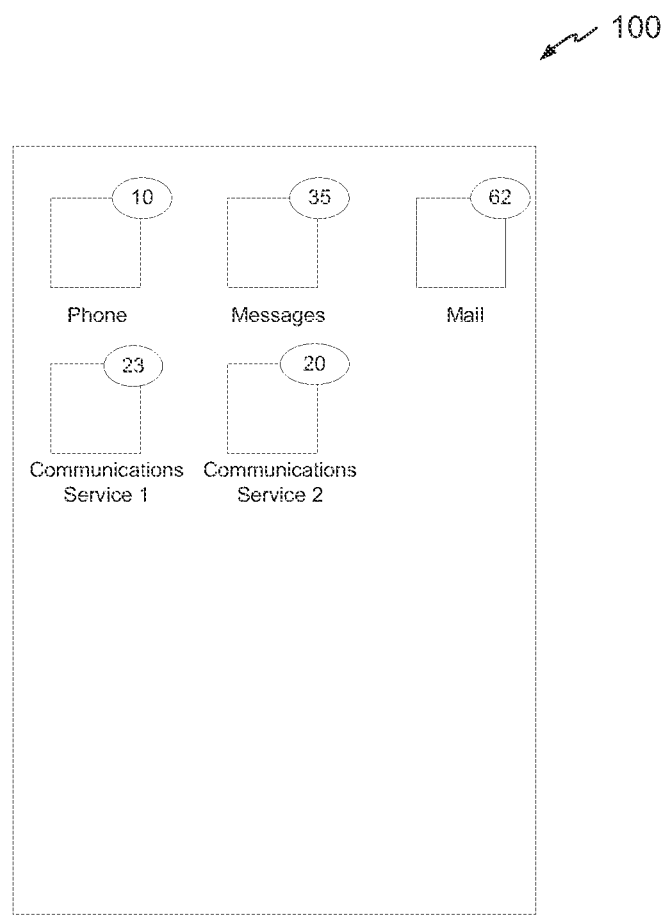

Introduction:

FIG. 1 illustrates an example graphical user interlace (GUI) 100 of a mobile communications device with various communications services applications available to be run on the mobile device. As an example, if a user of the mobile device desires to make a phone call, the user may access the "Phone" application by using an input method that is known for mobile devices (e.g., via a touchscreen of the device). As another example, if the user desires to access his social networking account, such as Facebook, LinkedIn, or Twitter, the user may access the "Communications Service 1" or "Communications Service 2" application. In addition to what is illustrated, the mobile device may have more or less applications, for example, based on the capabilities of the mobile device or other social networking accounts the user may have access to via the mobile device. For example, if a mobile device has a front-facing camera, a videoconferencing application may be available on the device.

Referring to FIG. 1, the GUI illustrates 10 missed called and/or voicemails, 35 new text messages, 62 unread emails, 23 missed notifications for communications service 1, and 20 missed notifications for communications service 2. The missed notifications may be from various people and/or organizations. This method of delivering missed notifications can be referred to as an application-centric approach, where each communications service application running on the device provides its own missed notifications. However, one person may have tried to reach the user of the mobile device using various communications services. For example, the person may have tried to call the user, leave a voicemail, and send a few text messages and emails. According to the application-centric approach, the missed notifications from the single person would be split between the "Phone", "Messages", and "Mail" applications. Although the user may regularly view missed notifications for some communications services, the same may not hold true for other communications services.

Referring back to the previous example, the user may regularly check the "Phone" and "Messages" applications regularly, and notice the missed call, voicemail, and text messages. However, the user may not regularly check emails and, therefore, may not notice the emails from the person that are related to the voicemail and text messages that were left.

Examples disclosed herein provide missed notifications to a user of a mobile device using a people-centric approach, where the missed notifications are grouped according to the senders of the electronic communications, rather than according to the communications services used by the senders. In others words, if a particular sender leaves different forms of communications for a user of a mobile device, such as a voicemail, text messages, and emails, all the missed notifications from the sender are grouped together rather than being split between the various communications services applications, as in the application-centric approach.

The following description is broken into sections. The first, labeled "Illustrative Examples," presents example screen views of a user interface for a mobile computing device that utilizes the people-centric approach. The second section, labeled "Components," describes examples of various physical and logical components for implementing various embodiments. The third section, labeled as "Operation," describes steps taken to implement various embodiments.

Figure 2A:
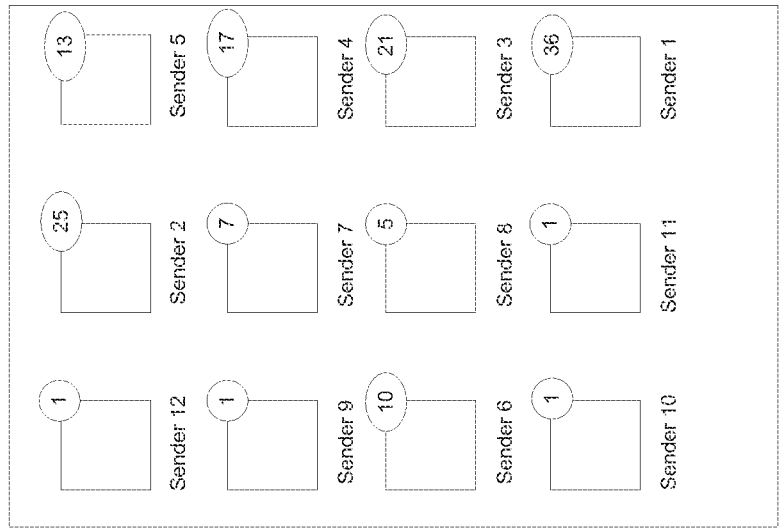
Figure 2B:
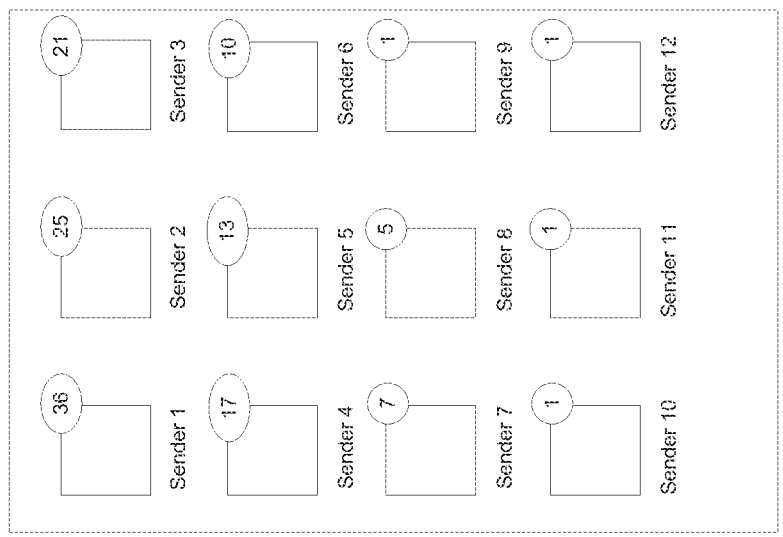

Illustrative Example:

FIGS. 2A-B illustrate example screenshots of the graphical user interface of a mobile communications device utilizing the people-centric approach. As illustrated, a user of the mobile device can view missed notifications for a particular sender, irrespective of the communications services used by the sender. The representation of a sender could be an icon depicting a generic image or an image associated with the sender. For example, the icon could be a picture of the sender or an image that the user associates with the sender (i.e., user-customizable). Based on the size of the list of senders, the list may be split between multiple pages of the GUI.

Figure 5:
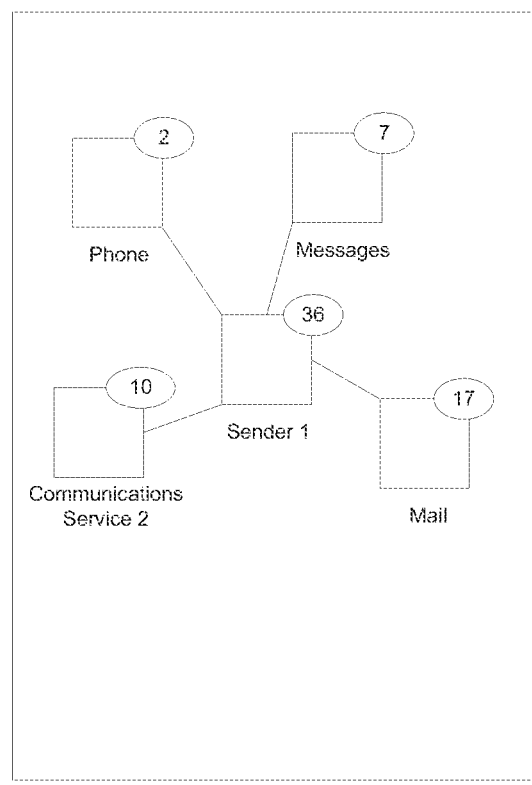
FIG. 5 illustrates a screenshot of a GUI of a mobile device after a user selects to review notifications associated with a sender, according to one example.

Referring back to the mobile device utilizing the application-centric approach illustrated in FIG. 1, there are a total of 150 notifications split between five communications services applications. With such a large number of notifications, a user of the mobile device may be dissuaded from opening each application and viewing every missed notification. However, with a mobile device utilizing the people-centric approach, the focus is no longer on the communications services used by a sender, but is on the sender itself. Therefore, the user of the mobile device may be able to view all the messages associated with a particular sender in a central location, as illustrated in FIG. 5.

The list of senders illustrated by the GUI of the device utilizing the people-centric approach may be sorted in various ways that a user of the device may find useful. As an example, the list of senders may be sorted according to the number of electronic communications received from each sender, as illustrated by the example screenshot of the GUI 200A in FIG. 2A. As a result, the user may be able to clearly see the senders which have attempted to communicate with the user most often. The order of the senders may change automatically based upon changes in information. For example, after the user views one or more of the missed notifications for a particular sender, the sender may be moved down in the list based on the number of missed notifications from other senders.

FIG. 2B illustrates an example screenshot of a GUI 200B with a list of senders that is sorted according to a user's preference and/or behavior. Compared to FIG. 2A, rather than sorting the list of senders according to the number of communications received from each sender, the list of senders may be sorted according to preferences that the user sets for senders and/or communications services. For example, the user may assign a priority level for particular senders, such that the senders are sorted higher or lower in the list. The priority level for the senders may be set in the contacts list of the device.

Referring to FIG. 2B, although there is only one missed notification from sender 12, sender 12 may be first on the list due to a high priority level assigned to the sender by the user. Likewise, although sender 1 may have the most missed notifications, sender 1 may be last on the list due to a low priority level assigned to the sender. In addition, it is possible for the list of senders to be sorted according to a combination of methods. For example, although sender 12 and sender 1 may be sorted according to the assigned priority levels given, other senders, such as senders 2, 10, and 11, may be sorted according to the number of communications received, as previously described.

Figure 3:
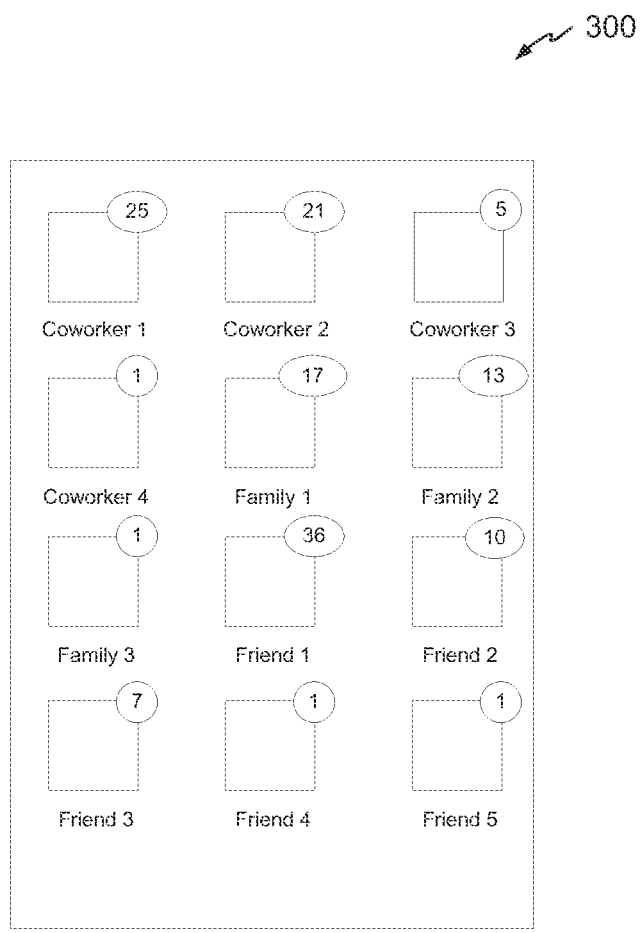
FIGS. 3-4 illustrate example screenshots of a GUI of a mobile communications device with a list of senders ordered according to user preferences.
Figure 4:
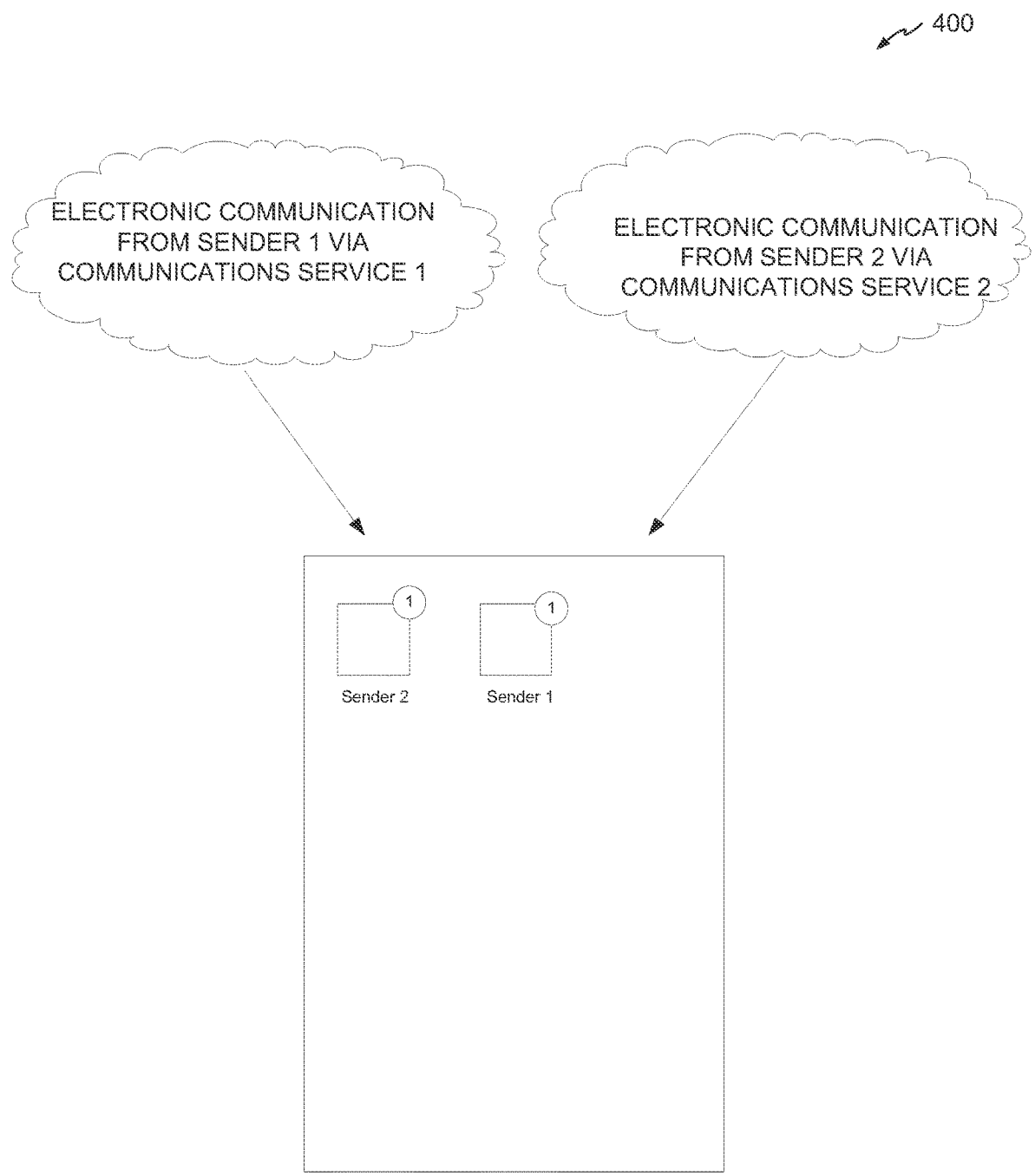

FIGS. 3 and 4 illustrate other preferences that may be set by a user of a mobile device for controlling the order of the list of senders. As an example, the list of senders may be ordered according to groups, such that a sender belonging to a first group may be ranked higher in the list than a sender belonging to a second group, as illustrated by the example screenshot of the GUI 300 in FIG. 3. In other words, the user of the device may prefer to receive alerts from coworkers first in the list, than from family members, and lastly from friends. The association of the user to each sender may be set manually by the user and/or determined automatically (e.g., whether a sender is a coworker, family, or friend).

As an example, certain senders may be automatically associated as a coworker based on an organizational chart that may be obtainable via a mobile platform associated with the user's organization that the mobile device has access to. As an example, the association of certain senders may be automatically set based on the relationship of the user with the senders within a communications service, such as Facebook or LinkedIn. For example, a sender may be listed as the user's spouse on Facebook and, as a result, may automatically be assigned to the Family group.

A user of a mobile device may give more importance to one communications service over another communications service. Therefore, the user may prefer to see notifications from a particular communications service at the top of the list of senders, an example of which is illustrated by the GUI 400 in FIG. 4. As illustrated, if the user prefers to see notifications from communications service 2 at the top of the list, a missed notification from sender 2 with a communication sent via communications service 2 is ranked higher in the list than the missed notification from sender 1 with a communication sent via communications service 1.

As mentioned above, the list of senders may be sorted according to a user's behavior, such as how the user handles electronic communications received from senders. As an example, the user's promptness in responding to communications from senders may be tracked over a period of time or continuously. In addition, the time of day when a user responds to certain senders and not to other senders may change the order of the list throughout the day. For example, during working hours, the list of senders may be sorted with coworkers higher in the list. After working hours, the list of senders may be sorted with family and friends higher in the list.

As more data is collected on how a user responds to a particular sender, the placement of the sender in the list may more closely reflect the importance of notifications from the sender to the user. In other words, the ranking of a sender in the list may be adjusted over time based on how the user handles electronic communications received from the sender.

As an example, if the user normally picks up phone calls from a sender, and promptly checks and/or responds to emails from the sender, notifications from the sender may be ranked higher in the list. In addition, how often the user responds to electronic communications from a given sender compared to communications received from another sender may determine whether the given sender is ranked higher or lower in the list than the other sender. However, if the user normally ignores calls from a sender, and rarely responds to text messages from the sender, notifications from the sender may not be important for the user to view. Therefore, the sender may be ranked lower in the list or remain off the list. This is reflected when comparing the GUIs illustrated in FIGS. 1 and 2B.

Referring back to the mobile device utilizing the application-centric approach illustrated in FIG. 1, there are a total of 150 notifications split between five communications service applications. However, referring to the mobile device utilizing the people-centric approach illustrated in FIG. 2B, there are a total of 138 notifications split between twelve senders. In other words, twelve notifications remain off the list when transitioning from the application-centric approach to the people-centric approach. These twelve notifications may be associated with one or more senders that the user of the mobile device ignored with regards to previous communications. As a result, the user of the device may not be alerted with regards to these twelve notifications.

As mentioned above, the list of senders may be sorted according to a combination of methods. For example, the list may be sorted according to a combination of rules associated with a user's preference and behavior, and according to the number of electronic communications received from each sender.

FIG. 5 illustrates a screenshot of a GUI 500 of a mobile communications device after a user selects to review notifications associated with a sender, according to an example. Upon selection of a given sender from the list of senders, a representation of the sender is displayed via the GUI, along with representations of each communications services used by the sender to send electronic communications. As an example, the representations of each communications services may be positioned around the representation of the sender, as illustrated. For each communications service, an indication of a number of electronic communications received from the sender via the communications service may also be provided.

Referring to FIG. 5, although four different communications services have been used to contact the user of the mobile device (phone, messages, communications service 2, and mail), the user is able to view all the messages associated with a particular sender in a central location. From this location, the user is able to access each application and review the notifications from the sender.

Rather than selecting from the list of senders to review electronic communications associated with a sender, messages from certain senders may be displayed directly by the GUI of the device. These senders may belong to a set of contacts a user of the device would want to be immediately notified of communications. This set may be manually created by the user or automatically generated according to a user's behavior, as described above. For example, if the user normally picks up phone calls from a given sender, and promptly checks and/or responds to emails from the sender, messages from the sender may be displayed directly by the GUI of the device. As a result, the user may be able to promptly respond to the message. By responding to the message, a communications service that corresponds to the message may be initiated. For example, if a sender sends a text message that says, "Call me", when the user of the device responds to the message, the phone application may be initiated. After responding to the message, the message may be removed from the GUI.

With numerous communications services available, it is possible that the user of a mobile device may not share the same communications services as other users. For example, one user may have access to Facebook and LinkedIn on their device, and another user may have access to Twitter and Google Hangouts on their device. The issue that arises between the two users is that they are not able to communicate with each other via the services previously mentioned. A user may not have accounts with the services found on the other user's device, or may have accounts with the services found on the other user's device but may not have the applications associated with the service installed on their device.

Figure 6:
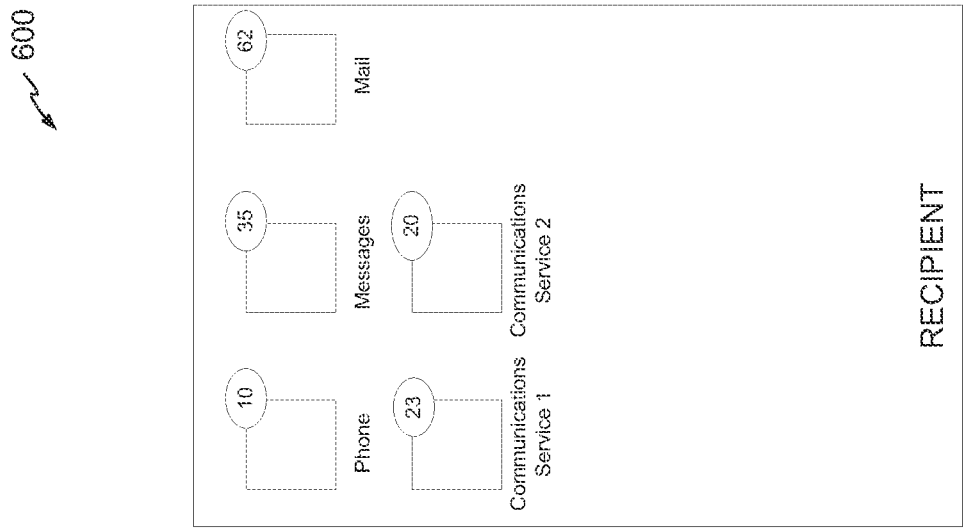
FIG. 6 illustrates a scenario where a sender makes an attempt to send an electronic communication to a recipient via a communications service application that is not installed on the recipient's device, according to one example.
Figure 6:
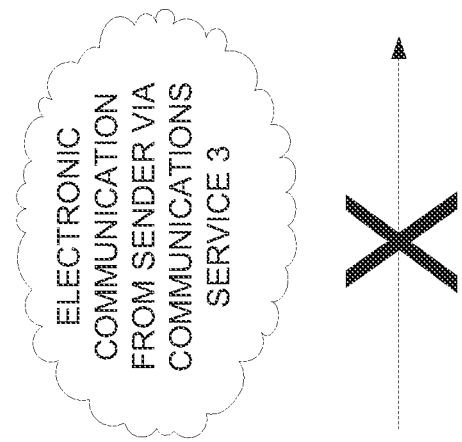
Figure 6:
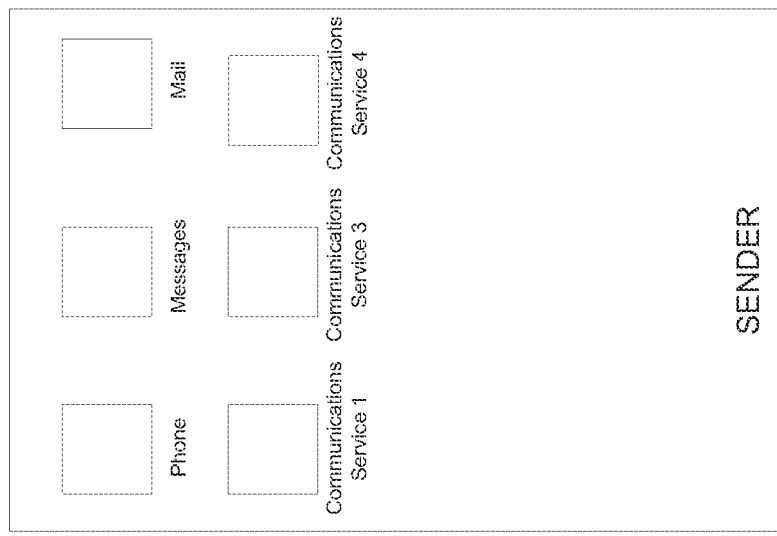

FIG. 6 illustrates a scenario 600 where a sender makes an attempt to send an electronic communication to a recipient via communications service 3 that is not installed on the recipient's device, as an example. Although the recipient may have an account associated with communications service 3, the recipient may not have an application installed that is associated with communications service 3. As a result, the recipient may not receive the communication, as indicated.

Figure 7A:
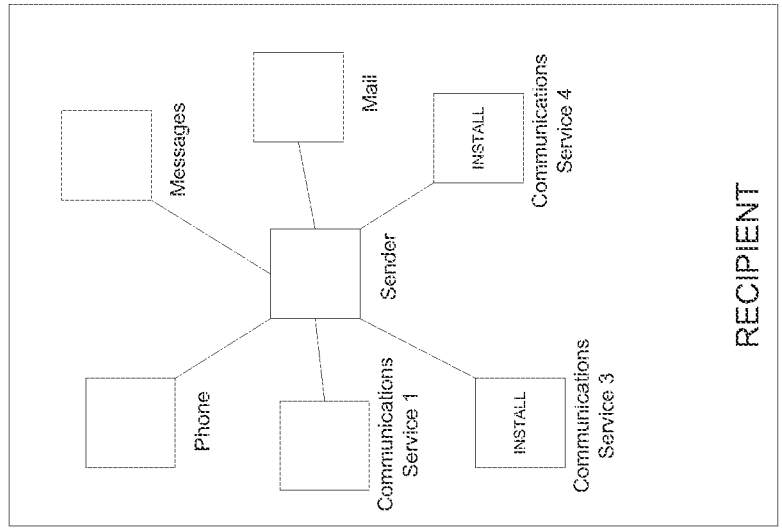
FIGS. 7A-7B illustrate example screenshots of users comparing communications services applications installed on their devices.
Figure 7B:
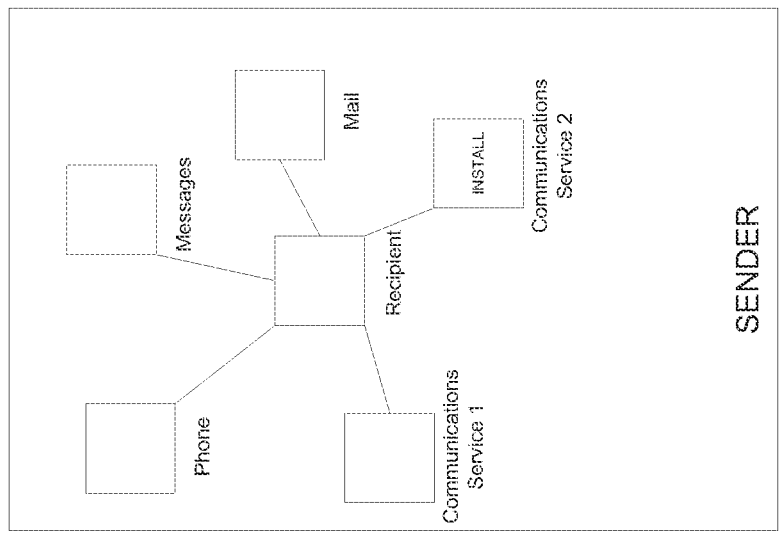

Examples disclosed herein provide for the ability for users to compare communications services applications installed on their respective devices. After the comparison, the users are given an option to install the communications services that are not found on their device, an example of which is illustrated in FIGS. 7A-B. A user may submit a request to compare the communications services installed on the other user's device. The other user may approve or deny the request to compare, and determine which services to include in the comparison. Referring to FIG. 6, the sender may not want the recipient to know about communications service 4 and, therefore, may not include it in the compare request (not shown).

Upon the other user's approval to compare, a comparison may be made between the communications services installed on either device to determine any communications services that are not installed on the devices. Based on the determination, a list may be displayed on each device of communications services that are not installed. Referring to an example screenshot of a GUI 700A of the sender's device in FIG. 7A, the sender is able to view results of the comparison with the communications services applications that are installed on the recipient's device (illustrated in FIG. 6). Communications service 2 is not installed on the sender's device, so the sender may be given the option to install communications service 2, as illustrated.

Similarly, referring to an example screenshot of a GUI 700B of the recipient's device in FIG. 7B, the recipient is able to view results of the comparison with the communications services applications that are installed on the sender's device. Communications services 3 and 4 are not installed on the recipient's device, so the recipient may be given the option to install one or more of communications services 3 and 4, as illustrated. As an example, if a user decides to install an application for a communications service, the other user involved in the comparison may be automatically registered as a friend or follower within the communications service. By being able to share more communications services between devices of users, the users are able to more effectively communicate with each other.

Figure 8:
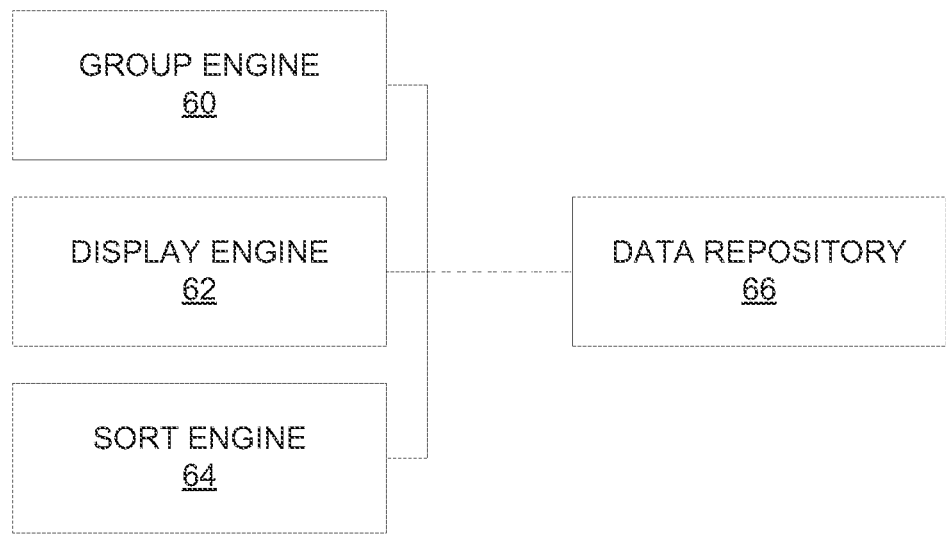
FIG. 8 is a block diagram depicting an example of components of a mobile communications device.
Figure 9:
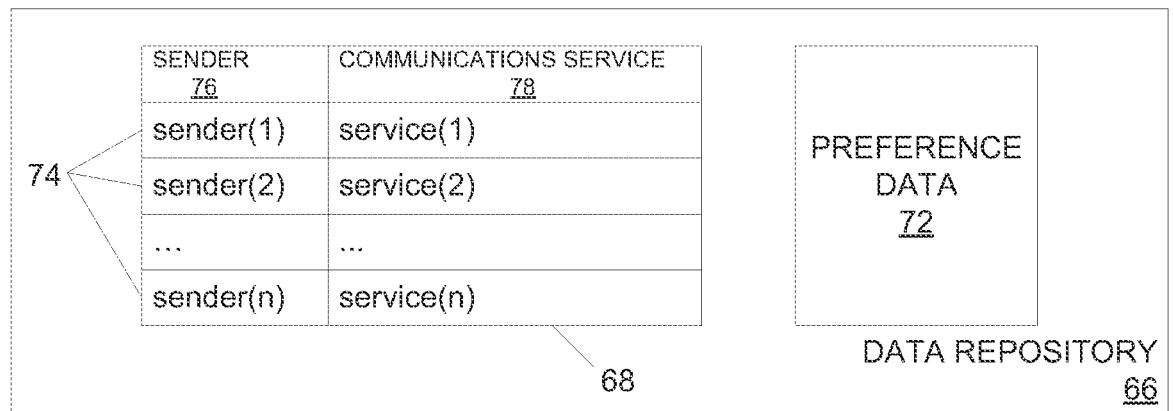
FIG. 9 is a block diagram depicting an example data repository that corresponds to FIG. 8.
Figure 10:
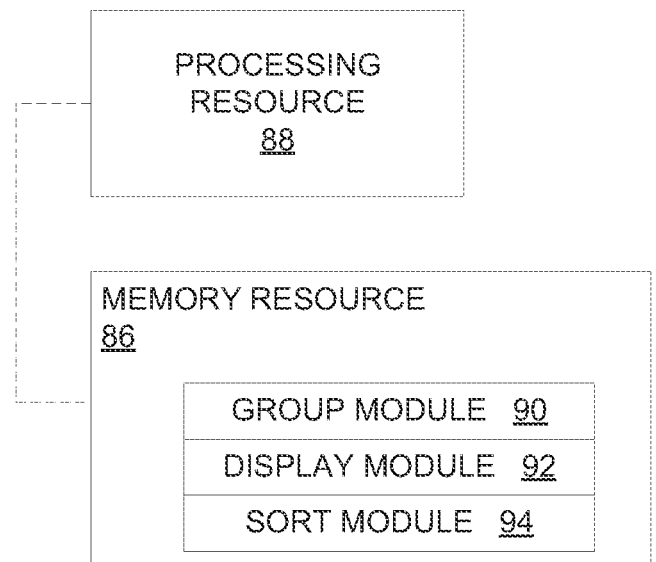
FIG. 10 is a block diagram depicting a memory resource and a processing resource, according to one example.

Components:

FIGS. 8-10 depict examples of physical and logical components for implementing various embodiments. In FIG. 8, various components are identified as engines 60-64. In describing engines 60-64, focus is on each engine's designated function. However, the term engine, as used herein, refers to a combination of hardware and programming configured to perform a designated function. As is illustrated later with respect to FIG. 10, the hardware of each engine, for example, may include one or both of a processor and a memory, while the programming is code stored on that memory and executable by the processor to perform the designated function. The programming can include an operating system and application. In addition, the hardware of each engine can include a display and any user input buttons.

FIG. 8 is a block diagram depicting components of a mobile communications device. In this example, the communications device includes group engine 60, display engine 62, and sort engine 64. In performing their respective functions, engines 60-64 may access data repository 66.

Repository 66 represents generally any memory accessible to the communications device that can be used to store and retrieve data. Group engine 60 represents a combination of hardware and programming configured to group electronic communications received from different communications services according to senders of the electronic communications.

Display engine 62 represents a combination of hardware and programming configured to display a list of one or more of the senders via a GUI of the communications device. For each sender on the list, the display engine 62 may display an indication of a number of electronic communications received from the sender. As a result, a user of the communications device may be able to view notifications based on people rather than the applications for the different communications services.

Sort engine 64 represents a combination of hardware and programming configured to sort the list of senders according to the electronic communications received. As described above, the list of senders may be sorted in various ways that a user of the device may find useful. As an example, the list of senders may be sorted according to the number of electronic communications received from each sender, as illustrated in FIG. 2A.

Referring to FIG. 2B, the list of senders may be sorted according to a user's preference and/or behavior. For example, the list may be sorted according to preferences that the user sets for senders and/or communications services. In addition, by tracking how a user handles electronic communications received from different senders, the list of senders may be ordered according to a user's behavior. As more data is collected on how a user responds to a particular sender, the placement of the sender in the list may more closely reflect the importance of notifications from the sender to the user. Although various ways have been described for sorting the list, they may be used independently or in combination.

FIG. 9 depicts an example implementation of data repository 66. In this example, repository 66 includes electronic communications data 68 and preference data 72. Electronic communications data 68 represents data maintained by at least the group engine 60. Electronic communications data 68 includes a number of entries 74 each populated with data in a sender field 76 and a communications service field 78. Data in sender field 76 identifies a sender for a received electronic communication. The sender may be a person and/or organization that may or may not be stored in the contacts list of the communications device. Data in communications service field 78 identifies the communications service used by a sender for a particular communication. The electronics communications data 68 may be updated continuously by the group engine 60, upon the receipt of new electronic communications from senders.

The group engine 60 may group the electronic communications according to senders, and the display engine 62 may display a list of one or more of the senders via a GUI of the communications device. As described above, the sort engine 64 may sort the list of senders according to the number of electronic communications received from each sender, which may be available from electronic communications data 68. In addition, the sort engine 64 may use user preference data 72 for sorting the list. Preference data 72 may include preferences that a user sets for senders and/or communications services. In addition, preference data 72 may include user behavior data, as described above.

In foregoing discussion, engines 60-64 were described as combinations of hardware and programming. Engines 60-64 may be implemented in a number of fashions. Looking at FIG. 10, the programming may be processor executable instructions stored on tangible memory resource 86 and the hardware may include processing resource 88 for executing those instructions. Thus memory resource 86 can be said to store program instructions that when executed by processing resource 88 implement the components of the communications device of FIG. 8.

Memory resource 86 represents generally any number of memory components capable of storing instructions that can be executed by processing resource 88. Memory resource 86 is non-transitory in the sense that it does not encompass a transitory signal but instead is made up of one or more memory components configured to store the relevant instructions. Memory resource 86 may be implemented in a single device or distributed across devices. Likewise, processing resource 88 represents any number of processors capable of executing instructions stored by memory resource 86. Processing resource 88 may be integrated in a single device or distributed across devices. Further, memory resource 86 may be fully or partially integrated in the same device as processing resource 88, or it may be separate but accessible to that device and processing resource 88.

In one example, the program instructions can be part of an installation package that when installed can be executed by processing resource 88 to implement the components of the communications device of FIG. 8. In this case, memory resource 86 may be a portable medium such as a CD, DVD, or flash drive or a memory maintained by a server from which the installation package can be downloaded and installed. in another example, the program instructions may be part of an application or applications already installed. Here, memory resource 86 can include integrated memory such as a hard drive, solid state drive, or the like.

In FIG. 10, the executable program instructions stored in memory resource 86 are depicted as group module 90, display module 92, and sort module 94. Group module 90 represents program instructions that when executed cause processing resource 88 to implement group engine 60 of FIG. 8. Display module 92 represents program instructions that when executed cause the implementation of display engine 62. Likewise, sort module 94 represents program instructions that when executed cause the implementation of sort engine 64.

Figure 11:
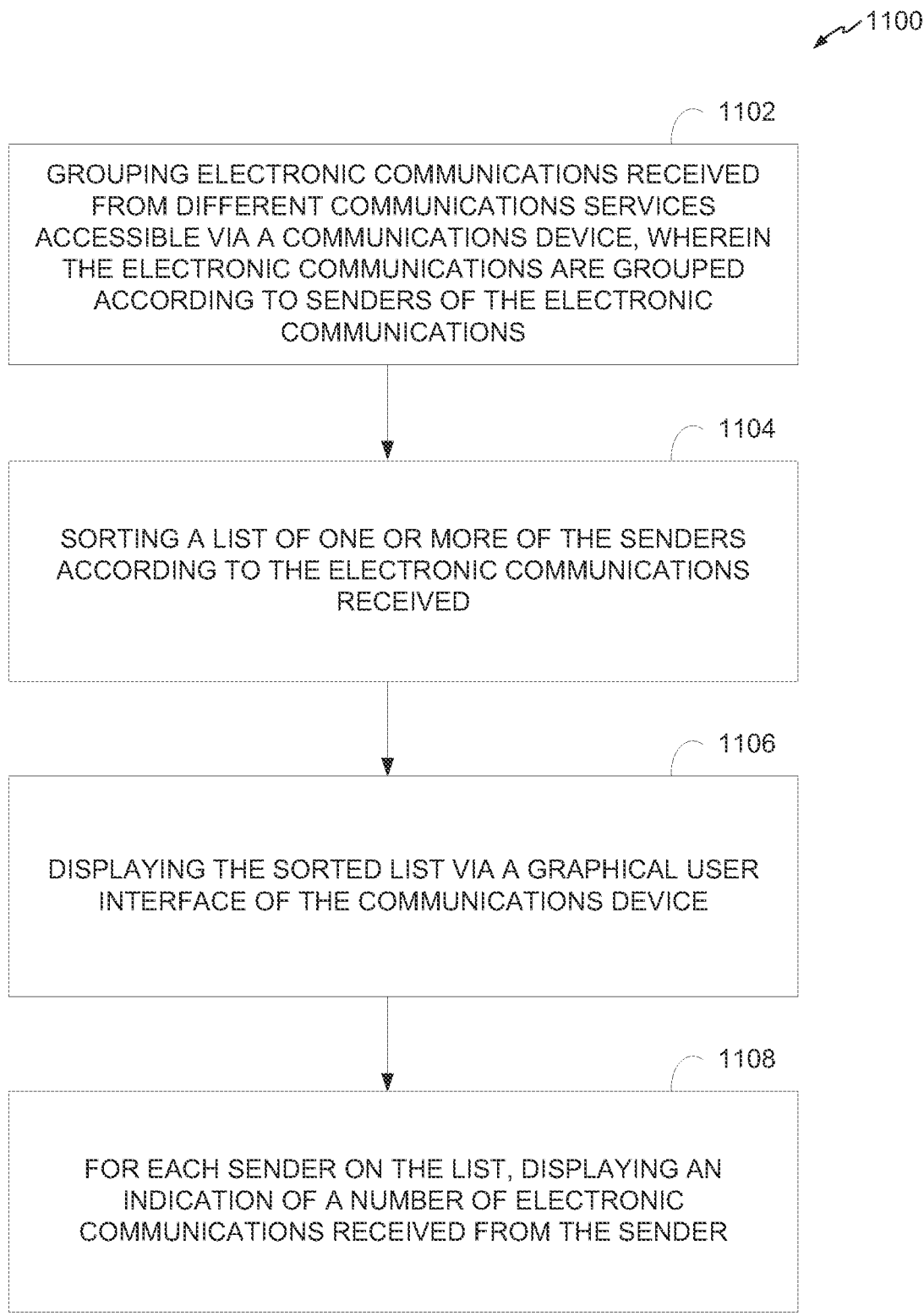
FIG. 11 is a flow diagram depicting steps taken to implement an example.

Operation:

FIG. 11 is a flow diagram 1100 of steps taken to implement a method for a communications device. In discussing FIG. 11, reference may be made to the screen views of FIGS. 2A-7B and the components depicted in FIGS. 8-10. Such reference is made to provide contextual examples and not to limit the manner in which the method depicted by FIG. 11 may be implemented.

First, electronic communications received from different communications services are grouped according to senders of the electronic communications (step 1102). Referring back to FIG. 8, group engine 60 may be responsible for implementing step 1102.

Upon grouping the electronic communications, a list of one or more of the senders may be sorted according to the electronic communications received (step 1104). Referring again to FIG. 8, sort engine 64 may be responsible for sorting the list according to the electronic communications received.

As described above, the list of senders may be sorted in various ways that a user of the device may find useful. For example, the list may be sorted according to the number of electronic communications received from each sender. As another example, the list may be sorted according to how the user handles electronic communications received from each sender. The ranking of a sender in the list may change over time based on how the user handles electronic communications received from the sender over time. In addition, the user may set priority levels for a sender or communications service, such that a sender is higher in the list, or communications sent from a sender via a particular communications service is higher in the list.

The sorted list may be displayed via a GUI of the communications device (step 1106). For each sender on the list, an indication of a number of electronic communications received from the sender may be displayed (step 1108). Referring again to FIG. 8, display engine 62 may be responsible for implementing steps 1106 and 1108.

Conclusion:

FIGS. 8-10 aid in depicting the architecture, functionality, and operation of various embodiments. In particular, FIGS. 8-10 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 11 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for a communications device, comprising:
grouping, by a processor of the communications device, electronic communications received by the communications device from different communications services accessible via the communications device, wherein the electronic communications are grouped according to senders of the electronic communications;
obtaining a user-assigned priority level for a priority sender;
sorting a list of the senders, other than the priority sender, according to a total number of the electronic communications, including answered and unanswered electronic communications, received from each of the senders;
placing the priority sender at a position within the sorted list based on the user-assigned priority level;
displaying the sorted list via a graphical user interface (GUI) of the communications device;
for each sender on the sorted list, displaying the total number of electronic communications received from the sender;
transmitting a request to compare communications services installed on a second communications device of a sender with communications services installed on the communications device;
receiving an approval responsive to the request from the second communications device of the sender;
responsive to the approval comparing the communications services installed on the communications device with the communications services installed on the second communications device of the sender;
determining one or more of the communications services installed on the second communications device of the sender are not installed on the communications device; and
displaying, via the GUI, a list of the one or more of the communications services installed on the second communications device of the sender that are not installed on the communications device.

2. The method of claim 1, comprising:
upon a selection of a given sender from the displayed list, displaying via the GUI:
a representation of the sender;
representations of each communications service used by the sender to send electronic communications, wherein the representations of each communications service are positioned around the representation of the sender; and
for each representation of a communications service, the total number of electronic communications, including the answered and unanswered electronic communications, received from the sender via the communications service.

3. The method of claim 2, comprising:
upon a selection of one of the representations of a communications service, displaying, via the GUI, electronic communications received from the sender via the communications service.

4. The method of claim 1, wherein sorting comprises sorting the list of senders according to how a user of the communications device handles electronic communications received from each sender.

5. The method of claim 4, comprising adjusting a ranking of a given sender in the list over time based on how the user of the communications device handles electronic communications received from the given sender.

6. The method of claim 5, wherein adjusting comprises ranking the given sender higher in the list than another sender if the user responds to electronic communications received from the given sender more than communications received from the other sender.

7. The method of claim 1, wherein sorting further comprises:
sorting a sender that sends electronic communications from a first communications service higher in the list than a sender that sends electronic communications from a second communications service.

8. The method of claim 1, comprising:
upon a selection of a communications service from the list, installing the communications service.

9. The method of claim 1, comprising:
displaying, via the GUI, a message received from a sender; and
upon selecting the message, initiating communications with the sender via a communications service that corresponds to the message.

10. The method of claim of claim 1, comprising:
transmitting the list of communications services installed on the communications device, the list of communications services installed on the communications device to be provided to the second communications device of the sender.

11. The method of claim of claim 10, comprising:
receiving a request to approve a comparison of the list of communications services installed on the communications device with the the list of communications services installed on the second communications device of the sender; and
transmitting an approval responsive to the request.

12. The method of claim 1, further comprising:
grouping the list of senders into a plurality of groups of senders, the plurality of groups of senders including a first group of senders and a second group of senders; and wherein sorting the list of senders is based further on:
prioritizing the first group of senders over the second group of senders during a first time period, and
re-sorting the list of senders by prioritizing the second group of senders over the first group of senders during a second time period after the first time period.

13. The method of claim 1, wherein the list of senders includes a first sender and a second sender, the method further comprising:
obtaining an indication of a first length of time between receipt of a first communication from a first sender and transmission of a first response to the first sender;
obtaining an indication of a second length of time between receipt of a second communication from a second sender and transmission of a second response to the second sender; and
wherein sorting the list of senders comprises sorting the first sender with respect to the second sender based on the first length of time and the second length of time.

14. A system for a communications device, comprising:
a processor; and
a memory storing instructions that when executed cause the processor to:
group electronic communications received from different communications services accessible via the communications device, wherein the electronic communications are grouped according to senders of the electronic communications;
obtain a user-assigned priority level for a priority sender;
sort, other than the priority sender, a list of the senders according to a total number of the electronic communications, including answered and unanswered electronic communications, received from each of the senders;
place the priority sender at a position within the sorted list based on the user-assigned priority level;
display the sorted list via a graphical user interface (GUI) of the communications device and, for each sender on the sorted list, to display the total number of electronic communications received from the sender;
receive a request to approve a comparison of a list of communications services installed on the communications device with a list of communications services installed on a second communications device of a sender;
transmit an approval responsive to the request;
obtain the list of the communications services installed on the communications device;
transmit the list of the communications services installed on the communications device, the list of the communications services installed on the communications device to be provided to the second communications device of the sender.

15. The system of claim 14, wherein the instructions are to cause the processor to:
upon a selection of a given sender from the displayed list, display via the GUI:
a representation of the sender;
representations of each communications service used by the sender to send electronic communications, wherein the representations of each communications service are positioned around the representation of the sender; and
for each representation of a communications service, the total number of electronic communications, including the answered and unanswered electronic communications, received from the sender via the communications service.

16. The system of claim 14, wherein the instructions are to cause the processor to sort the list according to how a user of the communications device handles electronic communications received from each sender.

17. A non-transitory memory resource storing instructions that when executed cause a processor of a communications device to:
group electronic communications received from different communications services accessible via the communications device, wherein the electronic communications are grouped according to senders of the electronic communications;
obtain a user-assigned first priority level for a first priority sender, and a user-assigned second priority level for a second priority sender;
sort a list of the senders according to a total number of the electronic communications, including answered and unanswered electronic communications received from each of the senders;
place the first priority sender at a first position in the sorted list based on the user-assigned first priority level and the second priority sender at a second position in the sorted list based on the user-assigned second priority level; and
display the sorted list via a graphical user interface (GUI) of the communications device and, for each sender on the sorted list, display the total number of electronic communications received from the sender;
transmit a request to compare communications services installed on a second communications device of a sender with communications services installed on the communications device;
receive an approval responsive to the request from the second communications device of the sender;

responsive to the approval, compare the communications services installed on the communications device with the communications services installed on the second communications device of the sender;

determine one or more communications services installed on the second communications device of the sender are not installed on the communications device; and display, via the GUI, a list of the one or more communications services installed on the second communications device of the sender that are not installed on the communications device.

18. The non-transitory memory resource of claim 17, wherein the instructions are to cause the processor to sort the list according to how a user of the communications device handles electronic communications received from each sender.

\* \* \* \* \*